Figure 1:
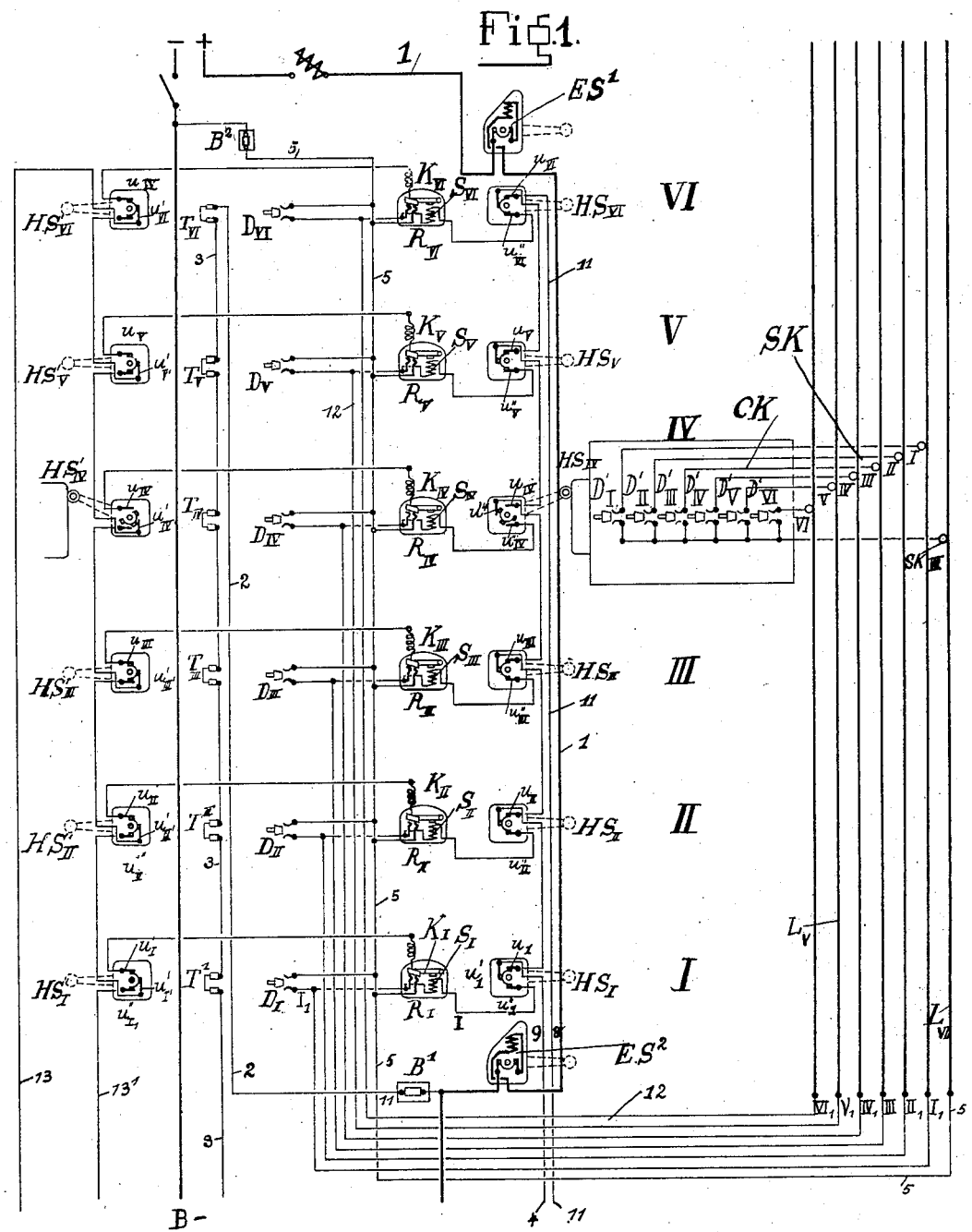

No. 736,393. PATENTED AUG. 18, 1903.
K. HERTWIG.
MEANS FOR CONTROLLING ELECTRIC OPERATING APPARATUS.
APPLICATION FILED DEC. 27, 1902.
NO MODEL. 5 SHEETS—SHEET 4.

No. 736,393. PATENTED AUG. 18, 1903.
K. HERTWIG.
MEANS FOR CONTROLLING ELECTRIC OPERATING APPARATUS.
APPLICATION FILED DEC. 27, 1902.
NO MODEL. 5 SHEETS—SHEET 5.
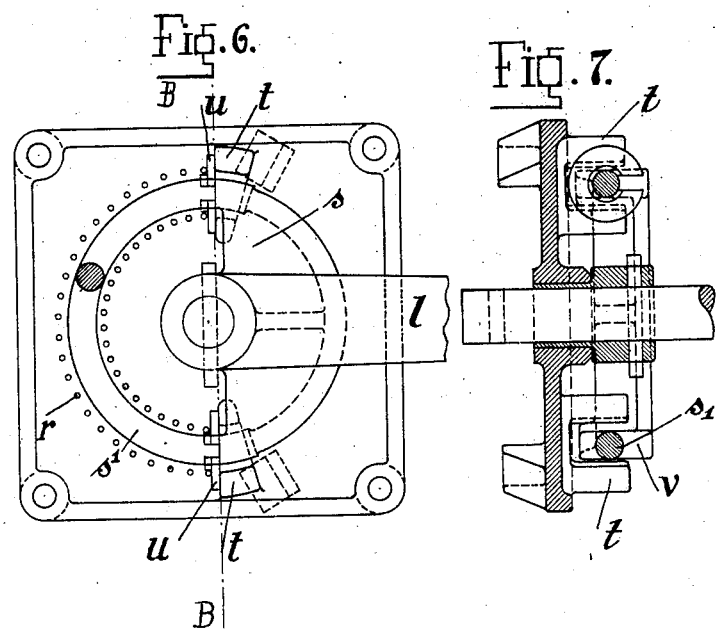
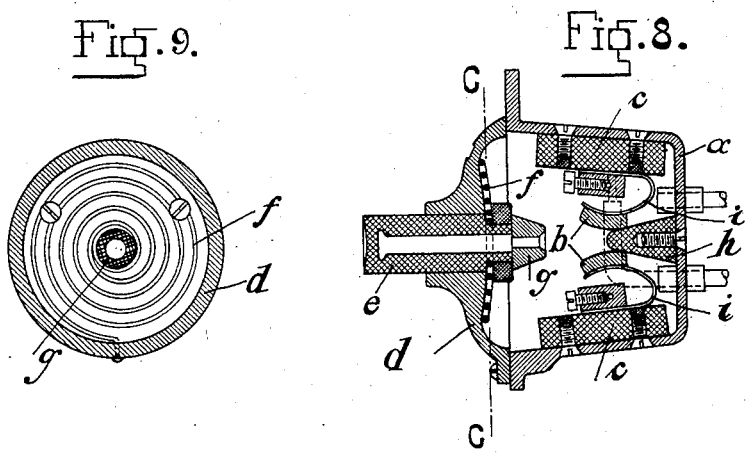
Witnesses
Inventor
Karl Hertwig
by
Attorneys No. 736,393.

Patented August 18, 1903.

UNITED STATES PATENT OFFICE.

KARL HERTWIG, OF FRANKFORT-ON-THE-MAIN, GERMANY, ASSIGNOR TO THE FIRM OF ELECTRICITÄTS ACTIEN GESELLSCHAFT VORM. W. LAHMEYER & CO., OF FRANKFORT-ON-THE-MAIN, GERMANY.

MEANS FOR CONTROLLING ELECTRIC OPERATING APPARATUS.

SPECIFICATION forming part of Letters Patent No. 736,393, dated August 18, 1903.

Application filed December 27, 1902. Serial No. 136,817. (No model.)

*To all whom it may concern:*

Be it known that I, KARL HERTWIG, a subject of the Emperor of Germany, residing and having my post-office address at 8 Kronprinzenstrasse, Frankfort-on-the-Main, Germany, have invented certain new and useful Improvements in Means for Controlling Electric Operating Apparatus, of which the following is a specification.

This invention relates to the control of electric operating apparatus of all kinds, but more particularly to the control of electric elevators. By the arrangement of various suitable devices it is rendered possible to control the working of the operating apparatus in a convenient and absolutely reliable manner from any desired position, which is of great importance for the control of electric elevators, since by this means it is rendered possible to cause the elevator to move from any one landing or stopping place to any other desired landing. Means are also provided for preventing interference with the control of the elevator during the movement of the cage. This is effected by causing the push-buttons, by means of which the apparatus is operated, to be locked or rendered inoperative when contact has been made at one point—that is to say, when one of the push-buttons has been pressed. For further security the starting apparatus for the driving-motor is constructed as a self-starter—that is to say, the movement of the starting-lever is initiated by pressing one of the push-buttons, and the further action of the apparatus for starting and stopping the motor is automatic, and therefore uniform under all circumstances, so that the progress of the starting and stopping is rendered totally independent from the control of the servants. Further security in working, which is of particular importance in the case of electric elevators, is afforded by the regulation of the speed. The purpose of this regulation of speed is to allow the cage to travel more rapidly during the normal part of its journey than directly after starting or before stopping. This also gives the advantage that the change from high speed to zero speed, and vice versa, is less acutely felt by the passengers. The essential feature of the invention is the fact that the entire circuit is adapted to be divided into two parts by means of stopping-place or landing switches adapted to be opened by the elevator-cage or the like. Each of these parts of the circuit contains a coil adapted to operate the starting-switch of the motor, and one of these coils is used for upward or forward travel, the other for downward or backward travel. The starting-switch itself is provided with suitable contacts and so arranged that both the coils referred to can never be in circuit at the same time and so that when the upward coil is put into circuit the downward coil is cut out, and vice versa.

To facilitate the description and render the invention easily understood, it will be described in detail as applied to an elevator, reference being made to the annexed drawings, in which—

Figure 2:
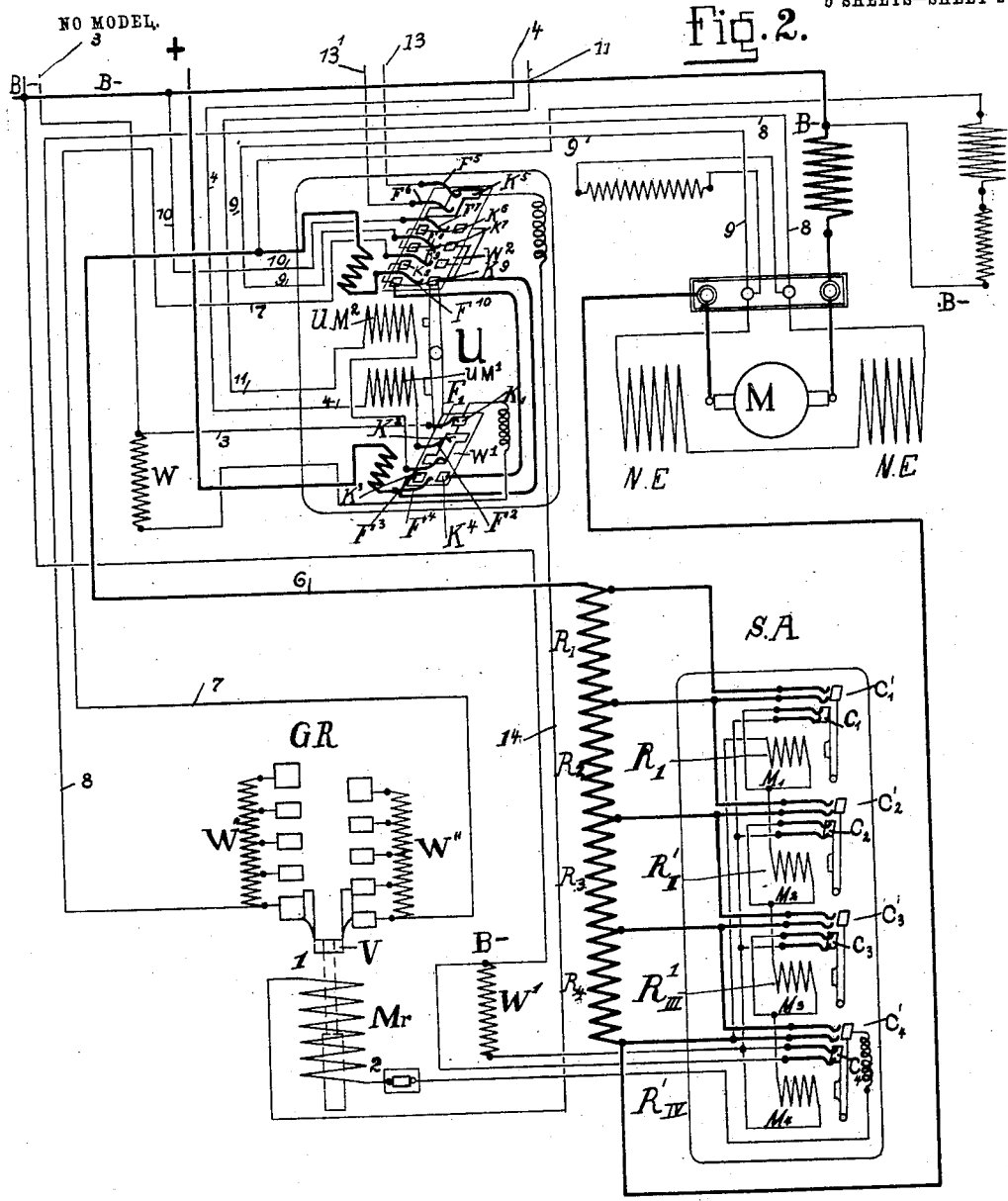
Figure 3:
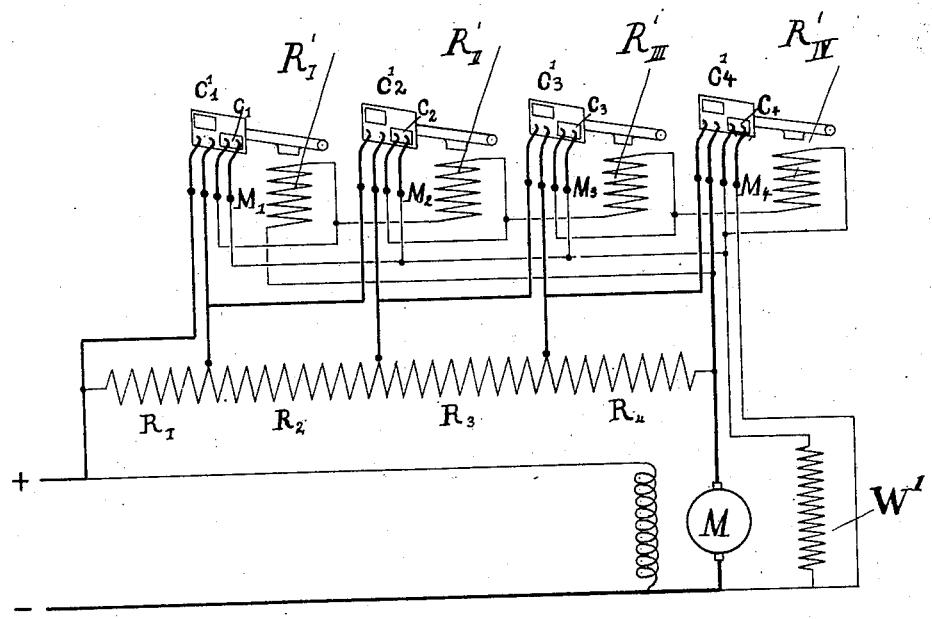
Figure 4:
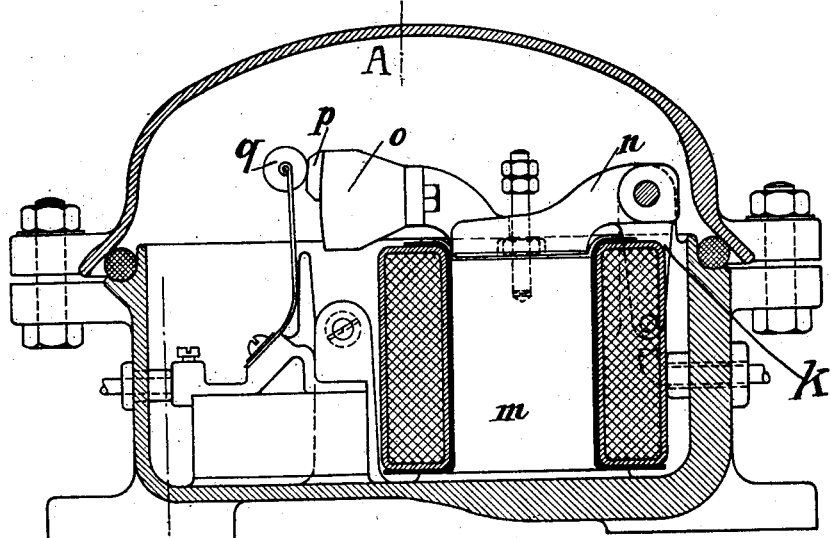
Figure 5:
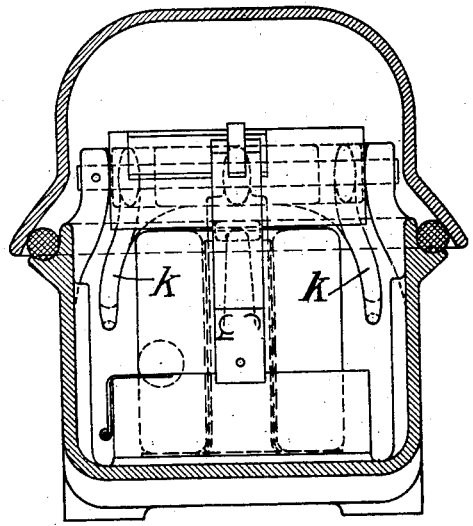

Figure 1 is a diagram of the circuit in the elevator-shaft. Fig. 2 shows the controlling parts. Fig. 3 is a diagram of the self-starter, illustrating its method of working. Fig. 4 is a detail side view of the relay, partly in section. Fig. 5 is a cross-section on the line A A of Fig. 4. Fig. 6 is a plan view of a landing-switch. Fig. 7 is a cross-section on the line B B of Fig. 6. Fig. 8 is a section of a push-button, and Fig. 9 a section on the line C C of Fig. 8.

The driving and controlling gear essentially comprises the motor M, the starting-switch U, the self-starter S A, the speed-regulator G R, the push-buttons D' to D VI, the set of current-conductors C K in the elevator-cage controlled by the push-buttons D' I to D' VI, the landing-switches H S I to H S VI and H S' I to H S' VI in series on the different floors I, II, III, IV, V, and VI, the friction-conductors L I to L VII in the elevator-shaft and the friction contacts or collectors S K I to S K VII on the elevator-cage. The motor M and switch U, starter S A, and the speed-regulator G R are situated near the winch, as usual. The push-buttons D I to D VI are on the respective floors I to VI by the sides of the doors leading to the elevator-shaft. The set of conductors C K is in the cage. The landing-switches H S I to H S VI and H S' I to H S' VI are so arranged in the shaft at each respective landing that they can be opened by the cage itself. In the circuit diagram (shown in Fig 1) six floors are provided for. The cage is shown stationed at landing IV, having opened the switch H S IV. The latter remains open as long as the cage remains at said landing IV. The breaking of the circuit thus produced divides the controlling-circuit into a circuit for descent and a circuit for ascent, the magnet U M' of the starting-switch being connected to the contact $u'$ IV at the point of interruption and the magnet U $M^2$ to the contact $u$ IV. When, therefore, any one of the landing-switches H S I to H S VI, which are joined together in series, is opened, the circuit is divided by the elevator-cage into two parallel parts, each of which contains one of the magnet-coils U M' U $M^2$ of the starting-switch U. Two circuits are thus formed, as already stated, one for ascent and one for descent. If, owing to some unforeseen occurrence, the elevator stops between two normal stopping-places, and therefore none of the landing-switches are opened, the operation of one of the landing push-buttons D I to D VI or of one of the elevator push-buttons D' I to D' VI will excite both magnet-coils U M' and U $M^2$ at once, and if the said magnet-coils are of equal value no movement of the cage will take place, since the pulls of the coils will balance each other (see Fig. 1) and the starting-switch U will not be operated. In order, therefore, to render the device operative under the circumstances stated, one of the magnets U M' U $M^2$ is preferably given a higher value than the other. If then both magnets are excited simultaneously, the cage will either move upward or downward and on reaching the next landing will automatically break the circuit and be ready to travel in either direction.

The working and control are as follows: If a person desires to enter the cage at landing I, for instance, he must first cause the cage to move to said landing, and therefore closes the switch D I, and thereby makes the following circuit: From the positive terminal current passes over the wire 1 and the two end switches E S' and E $S^2$, inserted into the said wire to act as safety device in case of a breakdown of the apparatus and to prevent the elevator from traveling beyond the terminal stopping-places. At B' the circuit branches off onto the wire 2, over the latter to the wire 3, containing the door-contacts T I to T VI, to the contact F'' of the starting-switch U, then over the circuit-closer K' and $K^2$ and $F^2$ to the coil U M', over the wire 4 to the landing-switch H S I, over the contact $u'$ I of the latter and $u''$ I to the coil S I of the relay R I and over the closed switch D I, the wire 5 and $B^2$ to the negative terminal. Since the magnet U M I thus receives current and is excited, the drums W' and $W^2$ are rotated out of their zero positions and the arm $F^4$ contacts with the contact-plate $K^4$ of the drum W', the arm $F^{10}$ contacts with the contact-plate $K^9$ of the drum $W^2$, and at the same time the arms $F^7$, $F^8$, and $F^9$ make contact with the contacts $K^6$, $K^7$, and $K^8$, respectively, whereas the arm $F^5$ remains in contact with $K^5$, but the arm $F^6$ slides off $K^5$. The motor M thus gets current over the contact $K^9$, arm $F^{10}$, wire 6, and starter S A, whereas the magnet-coil M E of the motor gets current over contact $K^8$, arm $F^9$, wire 7, the short-circuited regulator resistance G R, wires 8 and 9, arm $F^8$, contact $K^7$, arm $F^7$, contact $K^6$, and wire 10, which is directly joined to the negative terminal. The motor M thereupon starts and the cage moves from landing IV to landing I. At the latter it opens the switch H S I, and thus stops the motor and itself by breaking the circuit of the magnet U M' and allowing the drums W' and $W^2$ to be rotated back to their zero positions by the springs H' $H^2$. The person at landing I can now enter the cage and close in the latter that switch which bears the number of the landing which he desires to travel to—for instance, switch D' V for landing V. The circuit is then as follows: positive terminal, end switches E S' and E $S^2$, wire 1 B', wire 2, door-contacts T I to T VI, wire 3 to arm F' of the switch U, circuit-closer K' $K^2$, over $F^3$ to coil U $M^2$, wire 11 to landing-switch H S V, over the contact $u''$ V of the latter to coil S V of the relay R V, wire 12 to the shaft-conductor L V, collector S K V, closed switch D' V, collector S K VII, conductor L VII, wire 5 and negative terminal. The coil U $M^2$ is now excited, and the drums W' and $W^2$ rotate, so that the motor M is placed in circuit in the same manner as before and starts working and the cage is moved to landing V. The cage can also be sent from one landing to any other landing without traveling with it, for which purpose it is only necessary to provide at each landing a set of switches similar to that in the cage.

Further essential parts of the apparatus besides the push-buttons D I, D II, D III, D IV, D V, D VI are the relays R I to R VI, the purpose of which is to short-circuit the push-buttons D I to D VI when the former have been operated by the pressing of the latter. The arrangement is as follows: The coils S I to S VI of the relays R I to R VI are inserted in the wires leading from the contacts $u''$ I to $u''$ VI of the landing-switches H S I to H S VI. Each of these relays is provided with two contacts connected in parallel to the landing push-buttons D I to D VI and the elevator push-buttons D' I to D' VI. When after the pressing of the respective push-buttons one of the relays has attracted its armature, the respective contact-arm K I to K VI short-circuits the circuit-closer belonging to the push-button, and thereby the latter. If, for instance, the push-button D I at the landing I or the push-button D' I in the elevator is pressed, the circuit containing the coil S I of the first relay R I is closed and the lever K' is connected to both relay-contacts, so that after the push-button D I or D' I has been released the circuit remains closed until the cage opens the landing-switch H S I and the auxiliary circuit is thus broken.

As already mentioned, the closing of the auxiliary circuit has the result of exciting one of the coils U M' U M² of the starting-switch U and of moving the latter into the "on" position, so that the motor is started and the cage moves. The opening of the landing-switch H S I by the cage breaks the auxiliary circuit, so that the switch U returns to its zero position and the motor M and the lift stop.

In order to prevent interference with the control of the elevator by means of another push-button while the cage is moving, provision is made that the switch U places a resistance in the circuit which contains the coils S I to S VI of the relays R I to R VI and those of the switch U. This gives two advantages. First, the reduction of the current strength renders it impossible for another relay to be operated by the pressure of another push-button, since the current while sufficient to hold the armature attracted is not sufficient to pull an armature out of its "open" position. This also applies to the switch U. The second advantage lies in the fact that the overheating of the coils is prevented and that the latter can be made strong with the use of a comparatively small weight of copper. One of the push-buttons used is shown in Figs. 8 and 9. Owing to the fact that in the case illustrated a current of considerable strength must be used, the construction of the push-button requires special attention in order that they shall fulfil their purpose.

As shown in the drawings, two contact-pieces $b$ are resiliently attached to an insulating-support $c$ in a box $a$. The push-pin $e$, which is held in the open position by the flat spiral spring $f$, has bearing in the cover $d$ of the box. At the lower end of the said pin is the conical contact-maker $g$. When the pin $e$ is pressed and the resistance of the spring $f$ is overcome, the said contact-maker passes between the contact-surfaces $b$ and closes the circuit. On the bottom of the box $a$ a cone $h$, of insulating material, is provided for the purpose of holding apart the contact-surfaces $b$, which the springs $i$ tend to bring together, and also of limiting the forward movement of the push-pin $e$ and the pressure exerted through the latter on the contact-surfaces and the springs $i$. The essentially novel feature of this construction over the known push-buttons is the flat spiral spring $f$, used instead of the cylindrical helical spring or straight flat springs hitherto employed. The use of the flat spiral spring renders it possible to reduce the depth of the push-button while securing great resiliency.

Figs. 4 and 5 show one of the relays used. This relay comprises the magnet $m$, which is adapted to attract the armature $n$. The latter is provided with a projection $o$, carrying a contact-piece $p$, which, with the contact-drum $q$, is adapted to close the auxiliary current circuit when the relay is excited. By using the drum $q$ as relay-contact the friction of the contacts is rendered as small as possible. The resistance to the magnetic pull is supplied by helical springs bearing against two angles $k$, provided on the armature.

The construction of the landing-switches, to which the relays are connected, is shown in Figs. 6 and 7. In the switch illustrated the lever $l$ is fixed to the same axle as the segment $s$. The latter carries a circular closed arm $s'$ of circular cross-section. On this arm a helical spring $r$ is placed, which bears against disks $u$, held by projection $t$. When the stopping-place switch is rotated in a certain direction, the surface $v$ abuts against one of said disks $u$ and moves the latter and compresses the spring $r$. The contact device, which is not shown in the drawings, is arranged on the same axle as the lever. The landing-switch is moved back into the "off" position by the spring $r$, the special arrangement of which entirely prevents any uncertainty as to the off position, such as is liable to occur with other spring arrangements.

Other very essential portions of the controlling apparatus are the starter S A, which is a self-starter, and the speed-regulating device G R. The arrangement of the former has the advantage that the control of the starting-resistances is taken entirely out of the hands of the person who puts the apparatus into operation, and the said arrangement forms an essential element for obtaining the greatest simplicity, uniformity, and safety in working, the safety being further increased by the arrangement of the speed-regulator G R. In Fig. 2 the starter is diagrammatically shown in combination with the other controlling devices. In Fig. 3 it is diagrammatically shown in combination with the driving-motor. The starter works on the known principle with relays R' I, R' II, R' III, R' IV connected in parallel to the armature-terminals, so that as the counter electromotive force between the terminals of the started motor increases starting resistances are taken out of circuit; but the starter has very important advantages over the known automatic starters. Its arrangement is as follows: A number of magnets M' M² are arranged with the coils joined in series. The whole series is connected in parallel to the terminals of the motor-armature. Each of the said magnets has an armature which is adapted to operate a contact device. The contact devices are so constructed that when the magnets are without current the contacts $C'$ $C^2$ $C^3$ $C^4$ are closed and that when the magnets are excited the said contacts are open. The circuit is so arranged that in its position of rest the contact device of each magnet short-circuits the coils of the magnets beyond it. At first, therefore, only the first magnet M' can get current. When this magnet has attracted its armature, the coil of the second magnet is put into circuit by the breaking of contact at C', the magnet $M^2$ attracts its armature, puts the magnet $M^3$ into circuit, and so on. The armatures are also provided with contact devices $C'_1$ $C'_2$ $C'_3$ $C'_4$, connected in parallel with the starting resistances R' $R^2$ $R^3$ $R^4$ and adapted to short-circuit the said resistances when the armatures are attracted. The action of the starter is therefore as follows: When the motor-circuit is closed, current first flows through all the resistances R' $R^2 R^3 R^4$, then through the motor, which starts. The counter electromotive force between the motor-terminals gradually increases the first magnet M', attracts its armature, and short-circuits the first resistance R' by means of the contact C' I. At the same time it puts the coil of the magnet $M^2$ into circuit by breaking contact at C'. Current now flows through the coils of the first two magnets, and when the power developed at the motor-terminals has further increased to a certain extent the second magnet $M^2$ short-circuits the second resistance $R^2$ and opens the shunt-circuit of the third magnet $M^3$, and so on, until the last resistance $R^4$ has been short-circuited. The following advantages are obtained by this means: By reason of the connection of the relay-coils in series bobbins of comparatively few turns of thick wire can be used, and all the relay-bobbins can be provided with identical coils. The separate relays themselves are also identical in construction, which is convenient for their manufacture in large quantities.

In order to reduce the current used in the magnets and to obtain the full advantage of the absolute uniformity of the relays, a resistance W' is inserted in front of the magnet-coils at $C^4$ at the end of the starting period. This is possible for the reason that the current required to hold the relay-armatures is considerably smaller than that required to attract them.

The arrangement of the speed-regulator G R with the starter S A and the connection thereof to the other controlling parts and the motor M are shown in Fig. 2. As already mentioned, the purpose of the speed-regulator is to cause the elevator-cage to move more rapidly during the normal course of its journey than directly after being started and before being stopped. The apparatus can be so arranged that the cage acquires its maximum speed a certain distance from the place from which it starts and that the said maximum speed is reduced again a certain distance before the place at which the cage stops. The degree of safety with which the elevator works is by this means increased, and it also has the advantage of making the change from maximum speed to zero speed, and vice versa, less acutely felt by the passengers. For this purpose there is provided another set of landing-switches H S' I to H S' VI, which will hereinafter be referred to as the "regulating-switches." These are arranged in exactly the same manner as the landing-switches already described, except that they are opened before said landing-switches—that is to say, the landing-switches H S' I to H S' VI are connected in series in a ring-circuit and their contacts $u'$ I' to $u'$ VI' are connected to the relays R' to R VI by special wires. When one of the relays has attracted its armature, the respective regulating-switch is connected by the said wire to one of the mains, and thus forms one connection to the ring-circuit 13 13'. The other connection to the said ring-circuit 13 13' is formed by the wire 14, which is joined to the contact $K^5$ of the starting-switch U and to the regulating-magnet Mr, so that current can flow through the coil of the latter over the wire 14 to the contact $C^4$ of the starter S A. Owing to the special shape of the contact $K^5$, one terminal of the regulating-magnet coil is always connected to the main—namely, when the magnet U M I is excited—that is, during the descent of the cage—by the wire 13', the contact-arm $F^6$, the contact $K^5$, the drum $W^2$, and the wire 14, and when the magnet U $M^2$ is excited—that is, during the ascent of the cage—by the wire 13, contact-arm $F^5$, contact $K^5$, drum $W^2$, and wire 14. The contact $C^4$ is connected to the last relay R' IV of the self-starter S A, and is therefore not closed until the motor M is running at full speed. The regulating-magnet Mr is adapted to operate a contact device V, by which the resistance W' is inserted into the shunt-circuit M E of the motor M when the magnet Mr attracts. The contact device V can, of course, also be so arranged that when the apparatus is at rest resistance is contained in the main circuit and that the said resistance is gradually cut out at the end of the starting period, or a resistance may be connected in parallel to the armature. The action of the regulating device is therefore as follows: When one of the push-buttons—for instance, D'—is pressed, the elevator is operated in the manner described. At the same time the terminal 1 of the regulating-magnet Mr is joined to the main by the attraction of the relay R I over the circuit described. The other terminal, 2, is not connected to the main until the motor M has run up to speed. Thereupon the magnet Mr is operated, so that the motor and the cage acquire greater speed. When the cage reaches the current-carrying regulator-switch H S' I, it opens same and short-circuits the wires 13' and 14, connected over the regulator-switch H S' I to the relay R I. The terminal 1 of the magnet Mr is thus disconnected from the main and the speed of the motor M is reduced. The cage continues to move until it opens the landing-switch H S I, whereupon the relay R I releases its armature, the starting-switch U returns to its "off" position, the automatic starter S A is placed out of circuit, and the terminal 2 of the magnet Mr disconnected from the main.

I claim—

1. In an electric elevator, a hoisting-motor, circuits for said motor, an electrically-operated starting-switch, means for controlling the same including push-buttons, one arranged at each landing and a corresponding series of push-buttons arranged on the car and each push-button adapted to close the circuit of the starting-switch, and means controlled by said switch for varying the current to prevent all the other push-buttons from controlling the circuit of the starting-switch, after one push-button has closed it, until after the circuit is broken, substantially as set forth.

2. In an electric elevator, a hoisting-motor, circuits for said motor, an electrically-operated starting-switch, means for controlling the same including push-buttons, one arranged at each landing and a corresponding series of push-buttons arranged on the car and each push-button adapted to close the circuit of the starting-switch, and a resistance adapted to be placed into said circuit by the movement of said switch to prevent all the other push-buttons from controlling the circuit of the starting-switch, after one push-button has closed it, until after the circuit is broken, substantially as set forth.

3. In an electric elevator, a hoisting-motor, circuits for said motor, an electrically-operated starting-switch, a series of circuits one for each landing for controlling the switch, each circuit including a push-button on its landing and one of a corresponding series of push-buttons on the car and also a relay for short-circuiting the push-buttons, and a circuit-controller in each circuit operated by the car at the respective landings, substantially as set forth.

4. In an electric elevator, a hoisting-motor, a circuit therefor, an electrically-operated starting-switch, a resistance in the motor-circuit, means for cutting said resistance out of the circuit, a speed-regulating magnet, means for connecting one terminal thereof to the motor-circuit when the switch is operated to start the motor, means for connecting the other terminal with the motor-circuit when the said resistance is cut out, and means controlled by the moving car for short-circuiting said magnet, substantially as set forth.

5. In an electric elevator, a hoisting-motor, a circuit therefor, a series of resistances in said circuit, a series of magnets, one for each resistance, connected in parallel to the terminals of the motor-armature and the coils of said magnets joined in series, normally closed contacts for each magnet, each of which short-circuits the coils of the magnets beyond it, and armatures for said magnets, each operative to simultaneously cut out a resistance and cut the succeeding magnet into circuit, substantially as set forth.

6. In an electric elevator, a hoisting-motor, circuits for said motor, an electrically-operated starting-switch, two magnets for controlling said switch, one being of greater strength than the other, normally open circuits for exciting said magnets, and means for closing both circuits simultaneously and exciting both magnets, substantially as set forth.

7. In an electric elevator, a hoisting-motor, circuits therefor, an electrically-operated starting-switch, two normally open circuits for operating said switch to control the motor, a circuit-controller common to both circuits and normally in connection with each, said controller being movable in opposite directions to break its connection with one circuit while maintaining it with the other, substantially as set forth.

8. In an electric elevator, a hoisting-motor, circuits therefor, an electrically-operated starting-switch, two independent circuits for operating the switch, a circuit-controller common to both circuits and normally held in position to close both circuits, said circuit-controller being located in the path of the car to be operated thereby in either direction to break one circuit while maintaining the other one closed, substantially as set forth.

9. In an electric elevator, a circuit-controller supported in the path of the car to be moved thereby in either direction, and means for restoring the controller to its normal position when released by the car, substantially as set forth.

10. In an electric elevator, a pivotally-supported circuit-controller having an arm extending into the path of the car to be moved thereby in either direction, and means for returning said arm to its normal position when released by the car, substantially as set forth.

11. In an electric elevator, a pivotally-supported circuit-controller having an arm extending into the path of the car to be moved thereby, and a spring for normally holding said arm in a substantially horizontal position and yieldable under pressure of the car on the arm in either direction, substantially as set forth.

12. In an electric elevator, an electrically-operated starting-switch, two independent circuits therefor, a circuit-controller common to both circuits and normally maintaining both circuits closed, said controller being supported in position to be moved by the car when traveling in either direction to break one circuit while maintaining the other closed, and a spring for returning the controller to normal position when released by the car, substantially as set forth.

In testimony whereof I have signed my name to this specification in the presence of two subscribing witnesses.

KARL HERTWIG.

Witnesses:
 FRANZ HASSLACHER,
 MICHAEL VOLKE.